(12) United States Patent
Bailey et al.

(10) Patent No.: US 7,171,580 B2
(45) Date of Patent: Jan. 30, 2007

(54) METHOD AND APPARATUS FOR ENHANCING SYSTEM CLOCK AVAILABILITY

(75) Inventors: Sheldon Ray Bailey, Rochester, MN (US); Wayne Allan Britson, Rochester, MN (US); Alongkorn Kitamorn, Austin, TX (US); Michael Alan Kobler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 10/640,844

(22) Filed: Aug. 14, 2003

(65) Prior Publication Data

US 2005/0039068 A1    Feb. 17, 2005

(51) Int. Cl.
  *G06F 1/04*   (2006.01)
  *G01R 31/28*  (2006.01)
(52) U.S. Cl. .............................. 713/600; 713/1; 713/2; 714/731; 714/100

(58) Field of Classification Search .................... None
See application file for complete search history.

(56) References Cited

U.S. PATENT DOCUMENTS

| | | | | |
|---|---|---|---|---|
| 5,136,643 | A * | 8/1992 | Fischer ........................ 380/30 |
| 5,619,509 | A * | 4/1997 | Maruyama et al. ......... 714/707 |
| 5,928,293 | A * | 7/1999 | Jobling et al. ................. 701/2 |
| 6,728,891 | B2 * | 4/2004 | Hanjani ...................... 324/765 |
| 6,819,652 | B1 * | 11/2004 | Akhtar et al. ............... 370/230 |
| 6,944,738 | B2 * | 9/2005 | Dong .......................... 711/167 |

* cited by examiner

*Primary Examiner*—Lynne H. Browne
*Assistant Examiner*—Anand B. Patel
(74) *Attorney, Agent, or Firm*—Duke W. Yee; Thomas E. Tyson; Wayne P. Bailey (57) ABSTRACT

A method, apparatus, and computer instructions in a data processing system for managing clocks. The functionality of clock sources in the data processing system is verified to identify a set of valid clock sources in response to beginning an initial load process. Hardware is initialized in the data processing system using a valid clock source from the set of valid clock sources.

20 Claims, 5 Drawing Sheets

METHOD AND APPARATUS FOR ENHANCING SYSTEM CLOCK AVAILABILITY

BACKGROUND OF THE INVENTION

1. Technical Field

The present invention relates generally to an improved data processing system, in particular to a method and apparatus for handling clock signals in a data processing system. Still more particularly, the present invention provides a method, apparatus, and computer instructions for managing system clock availability in a data processing system.

2. Description of Related Art

Processors in a data processing system rely on internal timing devices, such as clocks, to operate. In many data processing systems, the clock contains a quartz crystal which generates a constant flow of pulses to allow the processor to operate. Additionally, this clock, also referred to as a system clock, also provides a timing reference to all of the other hardware logic in a data processing system. Many improvements have been made in system availability. However, the system clock still remains as a single point of failure in a data processing system.

Many data processing systems include multiple clock units or cards. These systems are provisioned to use one clock as a default clock. The selection of the default clock is preset. As a result, when a data processing system is booted, that data processing system is configured to use the default clock as a source for clock signals. If the default clock is faulty or fails, then the data processing system must be set to use a secondary clock as a source of clock signals.

The present invention recognizes that in absence of processes or apparatus for managing clocks in a data processing system is present. Therefore, it would be advantageous to have an improved method, apparatus, and computer instructions for managing system clocks and increasing availability of functional clock sources in a data processing system.

SUMMARY OF THE INVENTION

The present invention provides a method, apparatus, and computer instructions in a data processing system for managing clocks. The functionality of clock sources in the data processing system is verified to identify a set of valid clock sources in response to beginning an initial load process. Hardware is initialized in the data processing system using the valid clock source from the set of valid clock sources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
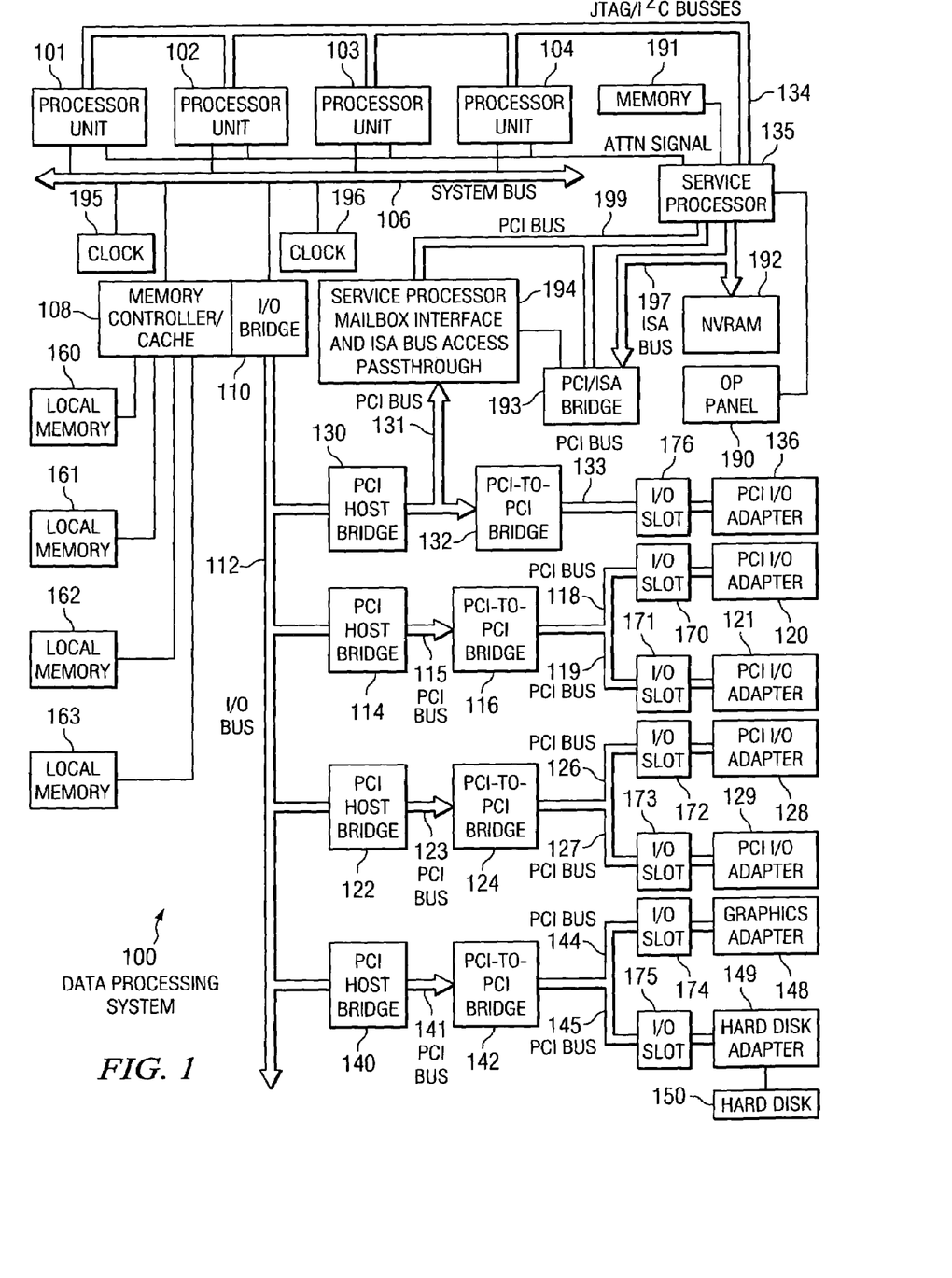
FIG. 1 is a block diagram of a data processing system in which the present invention may be implemented.

With reference now to the FIGS., and in particular with reference to FIG. 1, a block diagram of a data processing system in which the present invention may be implemented is depicted. Data processing system 100 may be a symmetric multiprocessor (SMP) system including a plurality of processor units 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processor units 101–104, and memory from local memories 160–163 is assigned to each of the three partitions. In these examples, memories 160–163 may take the form of dual in-line memory modules (DIMMs). DIMMs are not normally assigned on a per DIMM basis to partitions. Instead, a partition will get a portion of the overall memory seen by the platform. For example, processor unit 101, some portion of memory from local memories 160–163, and I/O adapters 120, 128, and 129 may be assigned to logical partition P1; processor units 102–103, some portion of memory from local memories 160–163, and PCI I/O adapters 121 and 136 may be assigned to partition P2; and processor unit 104, some portion of memory from local memories 160–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P3. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 197. Service processor 135 is coupled to service processor mailbox interface and ISA bus access pass-through logic 194 through its local PCI bus 199. Service processor 135 is also connected to processors units 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processor units 101, 102, 103, and 104 are connected together to an interrupt input signal of service processor 135. Service processor 135 has its own local memory 191, and has access to the hardware OP-panel 190.

When data processing system 100 is initially powered up, service processor 135 uses the JTAG/I$^2$C busses 134 to interrogate the system (host) processor units 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating processor units 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases processor units 101–104 for execution of the code loaded into local memory 160–163. While processor units 101–104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processor units 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

In the illustrated example, data processing system 100 includes clock 195 and clock 196 as clock sources for data processing system 100. These system clocks are used to generate signals to operate the hardware logic in data processing system 100.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The present invention provides an improved method, apparatus, and computer instructions for managing clock sources, such as clock 195 and 196 in FIG. 1. These examples, the mechanism of the present invention is initiated during initial program load (IPL). During IPL, which is also referred to as a boot process, built-in instructions in a storage device such as a read only memory (ROM) or flash memory chip are automatically executed on startup of the data processing system.

In these examples, the IPL is handled by a service processor, such as service processor 135. The processes forming the mechanism of the present invention also are handled by a service processor in these examples. The service processor verifies that the clock sources are functional. The clocks are started and registers in the processor units, such as processor units 101–104 are checked. If all of the system clock sources are working, then the hardware in the data processing system is initialized using the default clock source. On the other hand, if the error is present, this error is analyzed and a different clock source is selected if the default clock source is faulty.

Figure 2:
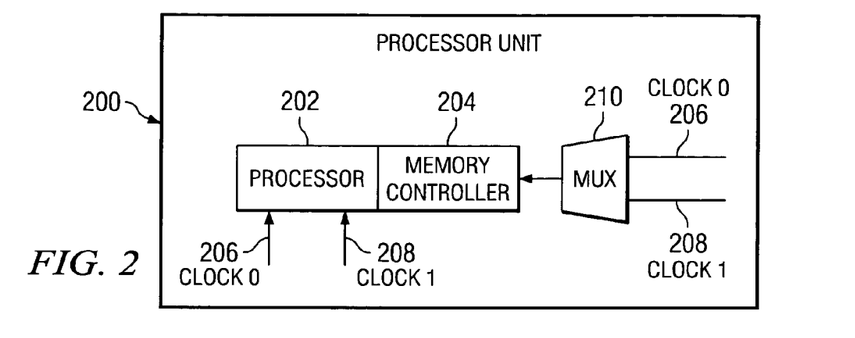
FIG. 2 is a diagram of a processor unit in accordance with a preferred embodiment of the present invention.

Turning next to FIG. 2, a diagram of a processor unit is depicted in accordance with a preferred embodiment of the present invention. Processor unit 200 is an example of a processor unit, such as processor unit 101, 102, 103, or 104. As illustrated, processor unit 200 includes processor section 202 and memory controller section 204. In these examples, memory controller section 204 provides functions similar to memory/controller cache 108 in FIG. 1, except the logic for these functions are located within the processor unit.

In both sections, processor section 202 and memory controller section 204 received clock signals during operation of processor unit 200. Processor section 202 receives clock signal 206 and clock signal 208 directly from the system bus. In this example, clock signal 206 originates from clock 0, which is the default or primary system clock. Clock 1 generates clock signal 208 and is the backup or secondary system clock. Memory controller section 204 receives these clock signals through multiplexer 210. Multiplexer 210 has an output connected to memory controller 204 and two inputs to receive clock signal 206 and clock signal 208. These connections form the primary sections for the clock signals.

Processor section 202 includes logic to select one of the two clock signals for use, while memory controller section 204 receives a clock signal selected by multiplexer 210. In other words, memory controller section 204 does not contain logic to select one of these two clock signals. Additionally, memory controller section 204 may receive a clock signal from a secondary route from processor 202. In this case, the clock signal received by memory section controller 204 is the same signal selected by the logic in processor 200.

During initial program load, a process executed by the service processor sets processor section 202 to use a primary clock source, such as clock signal 206. Multiplexer 210 is set also to select clock signal 206. The clocks are started and stopped. Registers within processor 202 and memory controller 204 are checked to see whether both sides received the primary clock signal. These results are recorded. Thereafter, both sections are set to receive the secondary clock signal, clock signal 208. The clocks are started and stopped. Then, a check of the registers is made to determine whether both sections received the clock signal.

This procedure is performed for all of the processor units in the data processing system. The results are analyzed to determine whether a hardware error is present in the processor units or in the clocks generating the clock signals. Thereafter, one of the clocks is selected for use depending on the results of the testing, and the initial program load continues to initialize the data processing system.

If a clock failure is detected during run time by one of the processor units, this failure is brought to the attention of the service processor. In response, the service processor may initiate a processor run time diagnostic to analyze the hardware error. A critical clock failure typically causes other hardware logic to fail resulting in a system checkstop. The occurrence of a system checkstop results in processing of the error. If the clock failure does not immediately result in a system checkstop, the error is logged for future analysis.

Figure 3A:
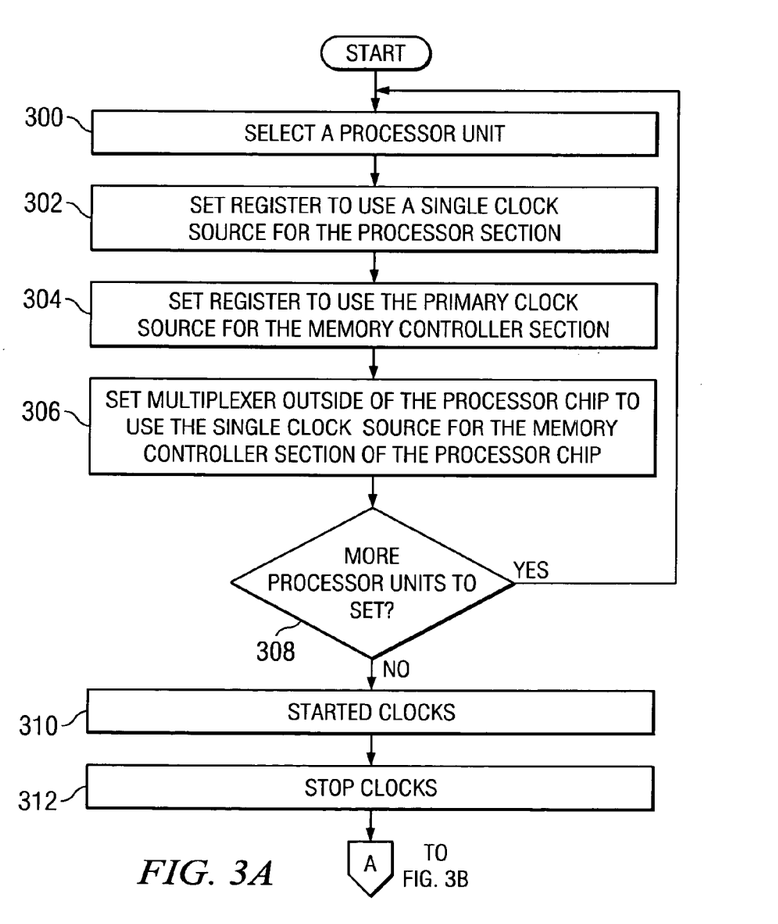
FIGS. 3A–3C are a flowchart of a process for testing clock sources in accordance with a preferred embodiment of the present invention.
Figure 3B:
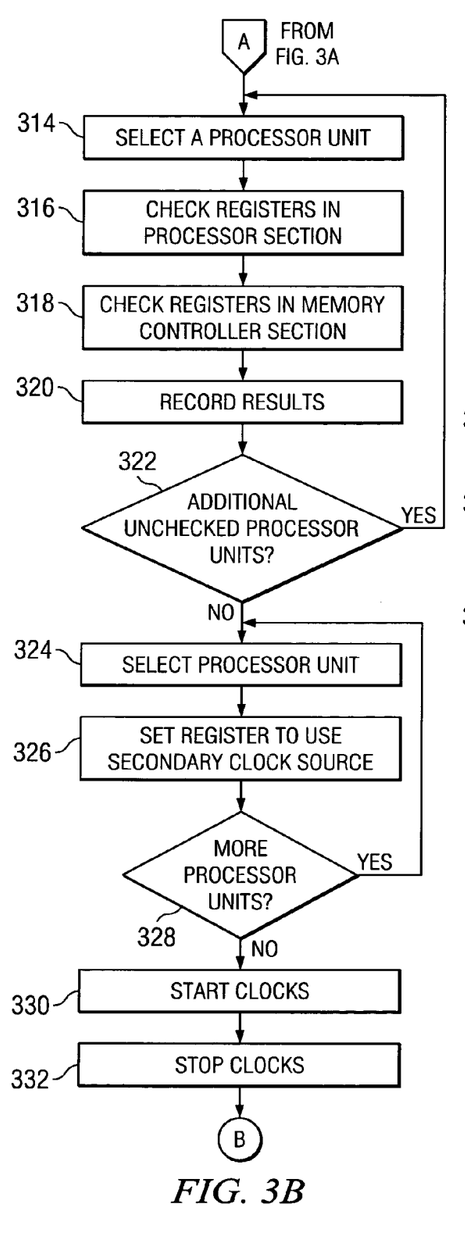
Figure 3C:
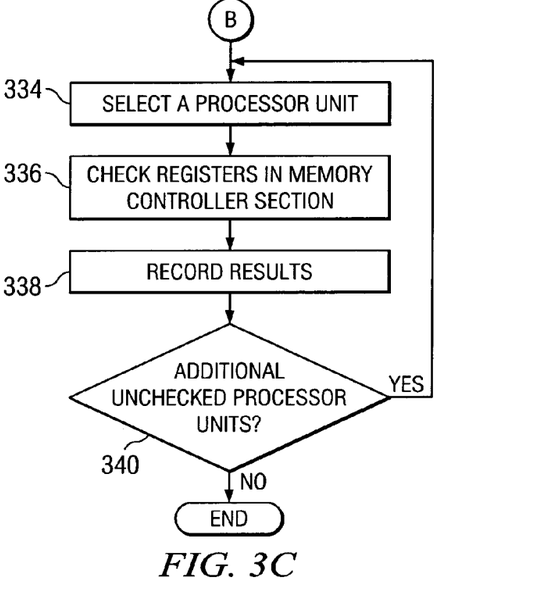

Turning now to FIGS. 3A–3C a flowchart of a process for testing clock sources is depicted in accordance with a preferred embodiment of the present invention. The process illustrated in FIGS. 3A–3C may be implemented in initial program load code executed by a service processor, such as service processor 135 in FIG. 1. This process is run for each clock source in the data processing system.

The process begins by selecting a processor unit from a set of processor units. A register in the processor section of the processor chip is set to use a single clock source (step 302). The processor chip is formed by the processor section and the memory controller section in the processor unit. Next, a register is set in the memory controller section to use the primary clock source (step 304). The multiplexer outside of the processing chip is set to use the single clock source for the memory section of the processor chip (step 306).

Afterwards, a determination is made as to whether more processor units are present to be set for the clock source (step 308). If additional processor units are present the process returns to step 300. Otherwise, the clocks are started (step 310), and then the clocks are stopped (step 312).

The starting and stopping of clocks will set registers in the processor units if the clock signal is received by the processor section or the memory controller section. A processor unit is selected for processing (step 314). The registers in the processor section are checked to determine whether the clock signal was received by this section (step 316), and the memory controller section is checked to see whether the memory controller section received a signal from the primary clock source (step 318). For the memory controller section the primary clock source is received from the multiplexer. These results are recorded (step 320).

A determination is made as to whether unchecked processor units are present (step 322). If unchecked processor units are present, the process returns to step 314. Otherwise, a processor unit is selected (step 324). A register in the memory controller section in a selected processor unit is set to use the secondary clock source (step 326). The secondary clock source provides a clock signal to the memory controller section through the processor section. Next, a determination is made as to whether additional processor units need to be set (step 328). If additional processor units are present to be set, the process returns to step 324.

Otherwise, the clocks are started (step 330), and then stopped (step 332). Afterwards, a processor unit is selected for analysis (step 334). The registers in the memory controller section are checked to determine whether a clock signal was received from a secondary source (step 336), and the results are recorded (step 338). A determination is then made as to whether additional unchecked processor units are present (step 340). If additional unchecked processor units are present, the process returns to step 334. Otherwise, the process terminates.

Figure 4:
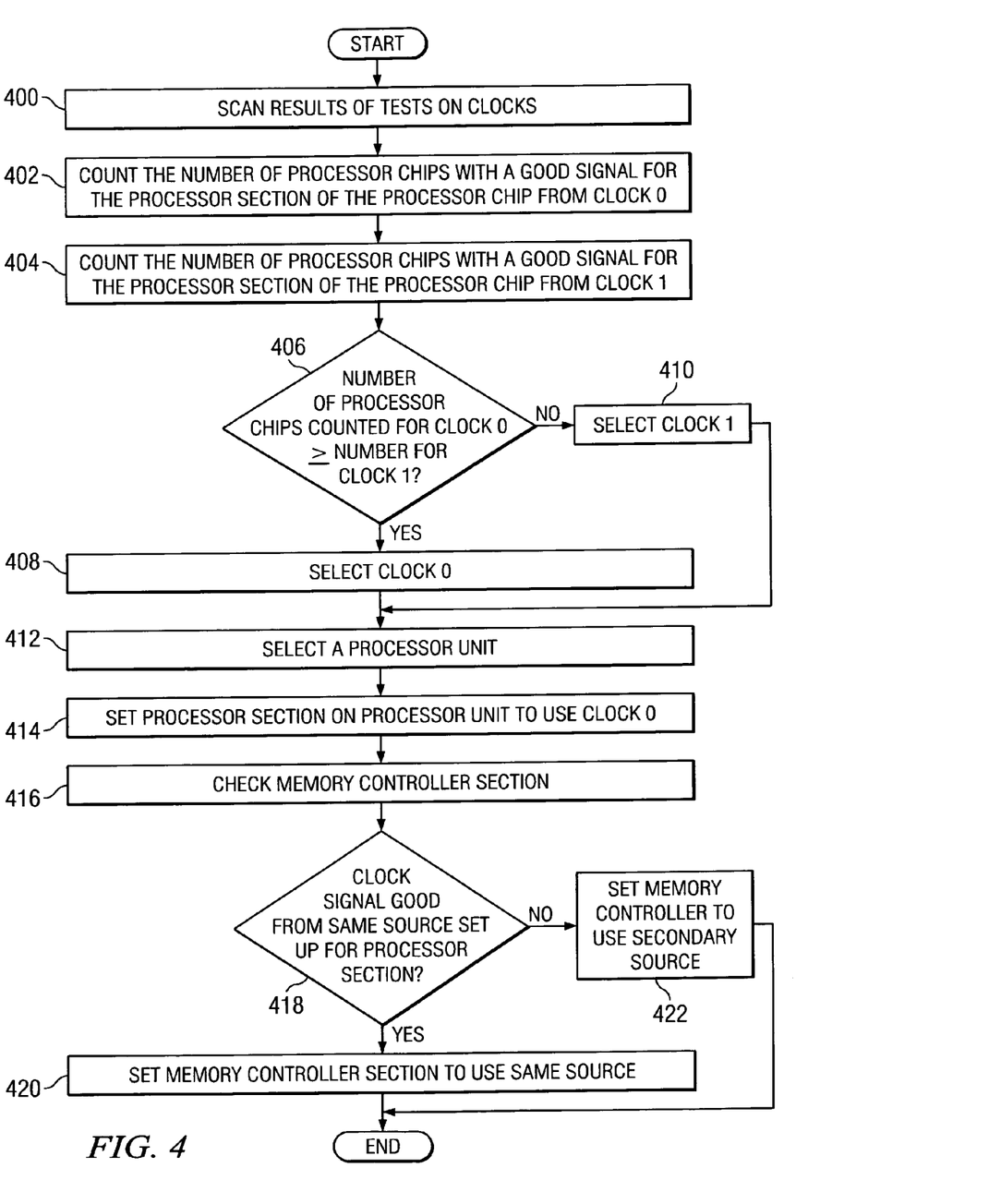
FIG. 4 is a flowchart of a process for analyzing results of testing processor units in accordance with a preferred embodiment of the present invention.

With reference now to FIG. 4, a flowchart of a process for analyzing results of testing processor units is depicted in accordance with a preferred embodiment of the present invention. The process illustrated in FIG. 4 may be implemented in initial program load code executed by a service processor, such as service processor 135 in FIG. 1.

The process begins by scanning the results of tests on clocks in the data processing system (step 400). The number of processor chips with a good signal for the processor section of the processor chip from clock 0 are counted (step 402). In this example, clock 0 is the default or primary clock source, while clock 1 is the backup or secondary clock source. Next, the number of processor chips with a good signal for the processor section of the processor chip from clock 1 are counted (step 404).

Next, a determination is made as to whether the number of processor chips counted for clock 0 is greater than or equal to the number of processor chips counted for clock 1 (step 406). If the number of processor chips for clock 0 is greater than or equal to the number counted for clock 1, clock 0 is selected (step 408). Otherwise, clock 1 is selected (step 410).

A processor unit is selected (step 412). The processor section on the processor chip is set to use clock 0 (step 414). The memory controller section is checked for the selected processor unit (step 416). A determination is made as to whether the clock signal is good from the same source setup for the processor section (step 418). In other words, the memory controller section is checked to see whether the clock signal received from the multiplexer is for the selected clock.

If the clock signal is good in step 418, the memory controller section is set to use the same source as the processor section (step 420) with the process terminating thereafter. Otherwise, the memory controller section is set to use the secondary source, which is received through the processor section (step 422) with the process terminating thereafter.

Figure 5:
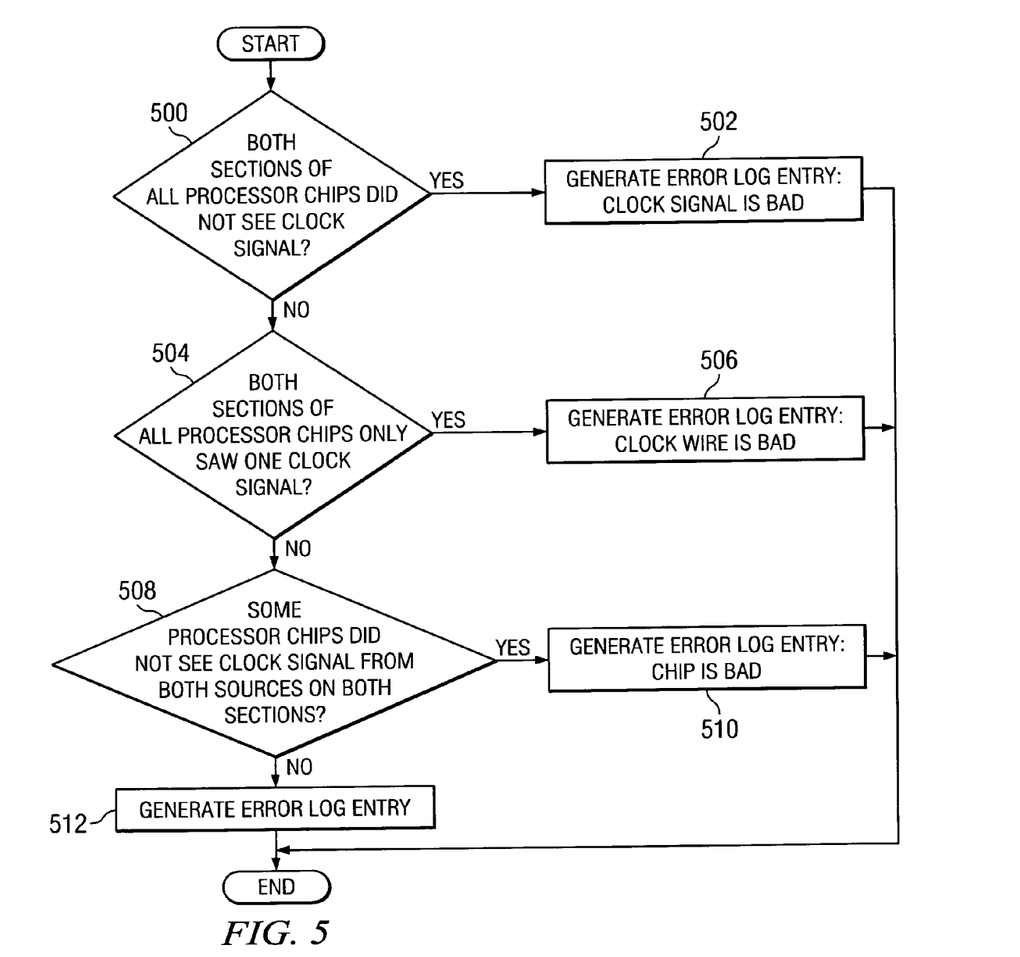
FIG. 5 is a flowchart with reference for analyzing errors in accordance with a preferred embodiment of the present invention.

With reference to FIG. 5, a flowchart with reference for analyzing errors is depicted in accordance with a preferred embodiment of the present invention. The process illustrated in FIG. 5 may be implemented in initial program load code executed by a service processor, such as service processor 135 in FIG. 1.

The process begins by determining whether both sections of all of the processor chips did not see the clock signal (step 500). If this determination is yes, an error log entry is generated stating that the clock signal is bad (step 502) with the process terminating thereafter. Otherwise, a determination is made as to whether both sections of all of the processor chips saw only one clock signal (step 504). If both sections of both processor chips saw only one clock signal, an error log entry is generated, stating that the clock wire is bad (step 506) with the process terminating thereafter.

Otherwise, a determination is made as to whether some processor chips did not see a clock signal from both sources on both sections (step 508). If this determination is yes, an error log entry is generated, stating that the chip is bad (step 510) with the process terminating thereafter. If the determination in step 508 is no, an error log entry is generated (step 512) with the process terminating thereafter.

Thus, the present invention provides a method, apparatus, and computer instructions for managing system clock availability in a data processing system. The mechanism with the present invention tests clock signals on processor units during initial program load or booting of the data processing system. Based on the results, an appropriate clock is selected for use. Further, the mechanism of the present invention also provides an error reporting process based on the results. In this manner, system clock availability is enhanced by allowing selection of the clock during initial program load.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the depicted embodiments use only two system clocks, the mechanism of the present invention may be applied to many different numbers of clocks, such as three or four clocks. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing clocks, the method comprising:
   responsive to beginning an initial load process, verifying functionality of clock sources in the data processing system to identify a set of valid clock sources; and
   initializing hardware in the data processing system using a valid clock source selected from the set of identified valid clock sources.

2. The method of claim 1, wherein a processor unit in the data processing system includes a processor portion and a memory controller portion, and wherein the verifying step comprises:
   setting the processor portion and the memory controller portion to use a first clock source, enabling the first clock source, and determining if the processor portion and the memory controller portion successfully received the first clock source; and
   setting the processor portion and the memory controller portion to use a second clock source, enabling the second clock source, and determining if the processor portion and the memory controller portion successfully received the second clock source.

3. The method of claim 1 further comprising:
   responsive to a presence of a faulty clock source, generating an error message indicating a particular type of error from a plurality of possible types of errors.

4. A method in a data processing system for managing clocks, the method comprising:
   responsive to beginning an initial load process, verifying functionality of clock sources in the data processing system to identify a set of valid clock sources; and
   initializing hardware in the data processing system using a valid clock source from the set of valid clock sources, wherein the hardware includes a set of processor units and wherein the verifying step includes:
   setting the set of processor units in the data processing system to use a first clock source;
   turning on and off the first clock source;
   checking the set of processor units to determine whether a first signal was received from the first clock source to form first results;
   setting the set of processor units in the data processing system to use a second clock source;
   turning on and off the second clock source;
   checking the set of processor units to determine whether a second signal was received from the second clock source to form second results, wherein the first results and the second results form a set of results; and selecting a clock source as the valid clock source for set of processor units during the initialization of the data processing system using the set of results.

5. The method of claim 1, wherein a processor unit in the set of processor units includes a processor portion that receives at least two clock signals from a system bus and a memory controller portion that receives a single clock signal from a multplexor.

6. The method of claim 1, wherein a processor unit in the set of processor units includes a processor portion and a memory controller portion, and wherein the processor unit receives a clock signal from a primary route and the memory controller portion receives the clock signal from the primary route and from a secondary route, wherein the secondary route is through the processor portion.

7. A data processing system for managing clocks, the data processing system comprising:

verifying means for verifying functionality of clock sources in the data processing system to identify a set of valid clock sources in response to beginning an initial load process; and initializing means for initializing hardware in the data processing system using a valid clock source selected from the set of identified valid clock sources.

8. The data processing system of claim 7, a processor unit in the data processing system includes a processor portion and a memory controller portion, and wherein the verifying means comprises:

first means for setting the processor portion and the memory controller portion to use a first clock source, enabling the first clock source, and determining if the processor portion and the memory controller portion successfully received the first clock source; and second means for setting the processor portion and the memory controller portion to use a second clock source, enabling the second clock source, and determining if the processor portion and the memory controller portion successfully received the second clock source.

9. The data processing system of claim 7 further comprising:

generating means for generating an error message indicating a particular type of error from a plurality of possible types of errors in response to a presence of a faulty clock source.

10. A data processing system for managing clocks, the data processing system comprising:

verifying means for verifying functionality of clock sources in the data processing system to identify a set of valid clock sources in response to beginning an initial load process; and initializing means for initializing hardware in the data processing system using a valid clock source from the set of valid clock sources, wherein the hardware includes a set of processor units and wherein the verifying means includes:

first setting means for setting the set of processor units in the data processing system to use a first clock source;

first turning means for turning on and off the first clock source;

first checking means for checking the set of processor units to determine whether a first signal was received from the first clock source to form first results;

second setting means for setting the set of processor units in the data processing system to use a second clock source;

second turning means for turning on and off the second clock source;

second checking means for checking the set of processor units to determine whether a second signal was received from the second clock source to form second results, wherein the first results and the second results form a set of results; and selecting means for selecting a clock source as the valid clock source for set of processor units during the initialization of the data processing system using the set of results.

11. The data processing system of claim 7, wherein a processor unit in the set of processor units includes a processor portion that receives at least two clock signals from a system bus and a memory controller portion that receives a single clock signal from a multplexor.

12. The data processing system of claim 7, wherein a processor unit in the set of processor units includes a processor portion and a memory controller portion, and wherein the processor unit receives a clock signal from a primary route and the memory controller portion receives the clock signal from the primary route and from a secondary route wherein the secondary route is through the processor portion.

13. A computer program product in a computer recordable-type medium for managing clocks, the computer program product comprising:

first instructions for verifying functionality of clock sources in a processor unit to identify a set of valid clock sources in response to beginning an initial load process; and second instructions for initializing hardware in the processor unit using a valid clock source selected from the set of identified valid clock sources.

14. The computer program product of claim 13, wherein the first instructions comprises:

instructions for setting a processor portion and a memory controller portion of the processor unit to use a first clock source, enabling the first clock source, and determining if the processor portion and the memory controller portion successfully received the first clock source; and instructions for setting the processor portion and the memory controller portion to use a second clock source, enabling the second clock source, and determining if the processor portion and the memory controller portion successfully received the second clock source.

15. The computer program product of claim 13 further comprising:

third instructions for generating an error message indicating a particular type of error from a plurality of possible types of errors responsive to a presence of a faulty clock source.

16. A computer program product tangibly embodied in a tangible computer recordable-type medium for managing clocks, the computer program product comprising:

first instructions for verifying functionality of clock sources in the processor unit to identify a set of valid clock sources in response to beginning an initial load process; and second instructions for initializing hardware in the processor unit using a valid clock source from the set of valid clock sources, wherein the hardware includes a set of processor units wherein the first instructions includes:

first sub instructions for setting the set of processor units in the data processing system to use a first clock source;

second sub instructions for turning on and off the first clock source;

third sub instructions for checking the set of processor units to determine whether a first signal was received from the first clock source to form first results;

fourth sub instructions for setting the set of processor units in the data processing system to use a second clock source;

fifth sub instructions for turning on and off the second clock source;

sixth sub instructions for checking the set of processor units to determine whether a second signal was received from the second clock source to form second results, wherein the first results and the second results form a set of results; and seventh sub instructions for selecting a clock source as the valid clock source for set of processor units during the initialization of the data processing system using the set of results.

17. The computer program product of claim 13, wherein a processor unit in the set of processor units includes a processor portion that receives at least two clock signals from a system bus and a memory controller portion that receives a single clock signal from a multplexor.

18. The computer program product of claim 13, wherein a processor unit in the set of processor units includes a processor portion and a memory controller portion, and wherein the processor unit receives a clock signal from a primary route and the memory controller portion receives the clock signal from the primary route and from a secondary route, wherein the secondary route is through the processor portion.

19. A data processing system comprising:

a bus system;

a communications unit connected to the bus system;

a memory connected to the bus system, wherein the memory includes a set of instructions; and a processing unit connected to the bus system, wherein the processing unit executes the set of instructions to verify functionality of clock sources in the processor unit to identify a set of valid clock sources in response to begin an initial load process; and initialize hardware in the processor unit using a valid clock source selected from the set of identified valid clock sources.

20. The data processing system of claim 19, wherein the processor unit includes a processor portion and a memory controller portion, and wherein the set of instructions to verify functionality includes instructions to:

set the processor portion and the memory controller portion to use a first clock source, enable the first clock source, and determine if the processor portion and the memory controller portion successfully received the first clock source; and set the processor portion and the memory controller portion to use a second clock source, enable the second clock source, and determine if the processor portion and the memory controller portion successfully received the second clock source.

\* \* \* \* \*